W. C. KEYS.
AXLE.
APPLICATION FILED MAY 16, 1919.
1,377,589.
Patented May 10, 1921.
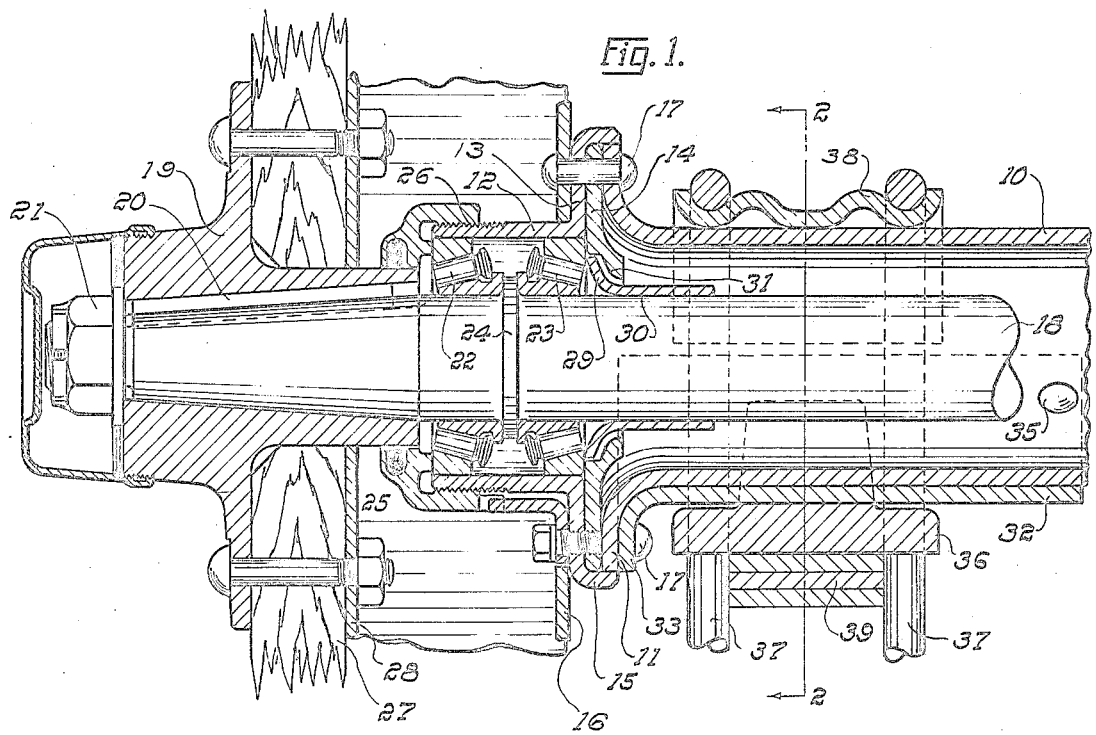
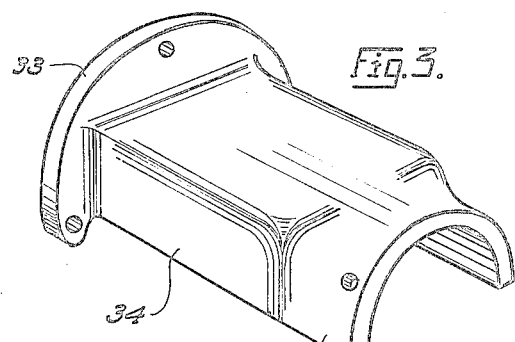
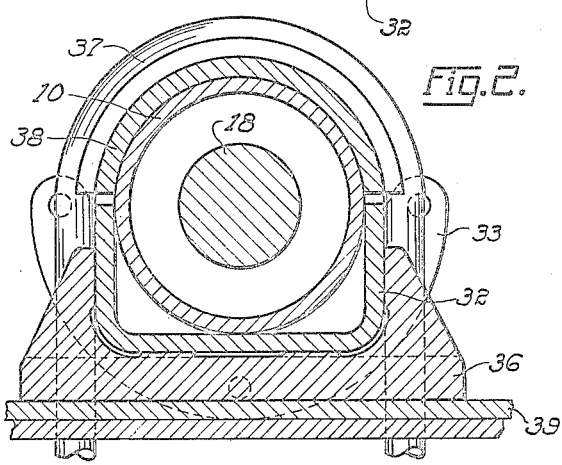
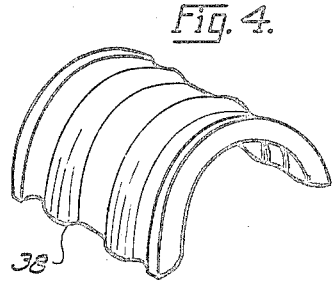
Inventor
Walter C. Keys.
Attorney

UNITED STATES PATENT OFFICE.

WALTER C. KEYS, OF CLEVELAND, OHIO, ASSIGNOR TO THE STANDARD PARTS COMPANY, OF CLEVELAND, OHIO, A CORPORATION OF OHIO.

AXLE.

1,377,589.

Specification of Letters Patent.   Patented May 10, 1921.

Application filed May 16, 1919.   Serial No. 297,677.

*To all whom it may concern:*

Be it known that I, WALTER C. KEYS, a citizen of the United States, and a resident of Cleveland, county of Cuyahoga, State of Ohio, have invented certain new and useful Improvements in Axles, of which the following is a specification.

This invention relates to driving axles for motor vehicles and more particularly to the construction and arrangement of the parts at the tubular end of the axle, especial attention being given to the provision of an improved form of spring attachment adapted to transmit the torque in the axle to the spring, in connection with the Hotchkiss type of drive, or in any other arrangement for transmitting the forces in the axle to the frame of a motor vehicle.

One of the objects of the invention is to provide an axle construction that may be economically manufactured and yet possess the requisite strength for withstanding the shocks and transmitting the forces to which the axle is subject. Another object of the invention is to provide a standardized housing construction which is adapted for use in connection with springs arranged either above or below the housing.

Other objects and the features of novelty will be apparent from the following description, taken in connection with the accompanying drawings, of which:

Figure 1 is a longitudinal section through the end portion of an axle embodying my invention;

Fig. 2 is a transverse section on the line 2—2 of Fig. 1;

Fig. 3 is a perspective view of the saddle on which the spring is mounted; and

Fig. 4 is a perspective view of the saddle for the spring bolts.

Referring to the drawings, 10 indicates the tubular end portion of an axle housing, it being understood that the opposite end of the housing will be of similar construction. The central portion of the housing has been omitted, as the features thereof are not in any wise limited by the present invention. In order to have the maximum strength in the axle housing, the tubular ends are preferably made of circular cross-section. This also facilitates manufacture and reduces the cost to a minimum. At the end of the housing 10, there is a radial flange 11 on which a tubular extension 12 is mounted, the extension 12 having a radial flange 13, and between this radial flange 13 and the flange 11, there is arranged a disk 14. The flange 13 is provided, at its periphery, with an axially extending flange 15 which surrounds and fits upon the peripheries of the flange 11 and the disk 14. A disk or plate 16, which serves as a brake anchor, is mounted on the extension 12 in abutting relation to the flange 13 and this disk and the flanges 11 and 13, as well as the disk 14, are all secured together by means of rivets 17 or other devices suitable for this purpose.

A driving shaft 18 is arranged in the housing 10 and has mounted on the outer end thereof the wheel hub 19, which may be secured in any suitable manner, as by the key 20 and nut 21. The shaft 18 is supported in the roller bearings 22 and 23, the latter engaging, on one side, with the disk 14, which serves as an abutment to limit movement of the bearing 23 inward in an axial direction. A collar 24 is provided on the shaft 18 between the bearings 22 and 23 and transmits the end thrusts in the shaft 18 to the bearings. A cap 25 has threaded engagement with the housing extension 12, as indicated at 26, and engages with the bearing 22 so as to coöperate with the disk 14 to hold the bearings 22 and 23 against axial movement. The spokes of the wheel are indicated at 27 and the usual brake drum at 28.

The interior of the disk 14 is made slightly conical in form to coöperate with the conical flange 29 on a sleeve 30 carried by the shaft 18. Between the flange 29 and the disk 14, suitable packing is provided, the arrangement being adapted to retain lubricant in the chamber containing the bearings 22 and 23.

In the case of axle housings having cylindrical tubular end portions, difficulty has been heretofore experienced in transmitting torque from the housing to the spring, due to the inability to properly clamp the spring seat on the housing. It has been sought to overcome this difficulty, in some instances, by providing tubular ends for the axle housing of non-circular or rectangular cross-section, but this decreases the torsional strength of the housing and increases the cost of manufacture. I have overcome these conditions by providing a saddle, illustrated in Fig. 3, which may be readily formed from sheet metal by the stamping process and which comprises an end portion 32, the interior of which is adapted to fit the exterior of the housing, a radial flange 33 adapted to abut against the flange 11 on the housing and an intermediate portion 34 of rectangular or polygonal cross-section on which the spring is mounted. The flange 33 is secured to the flange 11 by certain of the rivets 17, which are so proportioned as to be capable of transmitting all of the torsional forces from the housing to the saddle. The end 32 of the saddle may also be secured to the housing by rivets 35 to give additional strength to the structure.

A spring seat 36 is arranged on the portion 34 of the saddle and secured thereon by the usual spring bolts 37, of U form, which surround the axle and are seated in the corrugated saddle 38, which may be loosely arranged on the housing 10. It will be understood that, while the spring seat 36 is shown in Fig. 1 as arranged under the axle housing, the parts may be arranged with equal facility upon the upper side of the housing. The leaves of a spring are indicated at 39 and these will be clamped against the seat 36 in the usual manner.

The saddle illustrated in Fig. 3 is a comparatively inexpensive part to manufacture and on account of being riveted to the housing and having a rectangular cross-section where it receives the spring seat, permits the ends of the axle housing to be of circular cross-section and, therefore, of maximum strength torsionally, while at the same time providing a rectangular or polygonal cross-section to receive the spring seat, this form is best adapted for transmitting torsional forces from the axle to the spring seat. The construction also has the feature of subjecting the rivets 17 and 35, which secure the saddle to the housing, to purely shearing stress, which they are best adapted to withstand.

Having thus described my invention, what I claim is:

1. In axle construction, the combination of a housing having a tubular end portion and a flange at the end thereof, a member seated upon said end portion and having a flange at its outer end abutting said flange on the housing, and means for securing said flanges together.

2. In axle construction, the combination of a housing having a tubular end portion of rounded cross-section and an integral terminal flange at the end thereof, a member seated upon said end portion and having a non-circular exterior portion and a flange abutting said flange on the housing, and means for securing said flanges together.

3. In axle construction, the combination of a housing having a tubular end portion of circular cross-section and a flange at the end thereof, a member arranged on said end portion of the housing and having a circular interior portion fitting the exterior of the housing, a substantially polygonal exterior and an end flange abutting said flange on the housing, and means for securing said flanges together.

4. In axle construction, the combination of a housing having a tubular end portion of circular cross-section and a flange at the end thereof, a member arranged on said end portion of the housing and having at one end a portion conforming to the exterior of the housing and secured thereon, an intermediate portion having substantially flat exterior faces and a flange at the other end abutting said flange on the housing, and means for securing said flanges together.

5. In axle construction, the combination of a housing having a tubular end portion of circular cross-section and a flange at the end thereof, a member arranged on said end portion of the housing and having at one end a portion conforming to the exterior of the housing and riveted thereon, an intermediate portion of substantially rectangular cross-section, and the other end having a flange abutting said flange on the housing and riveted thereto.

6. In axle construction, the combination of a housing having a tubular end portion and a flange at the outer end thereof, a member seated upon one side of said end portion and having a substantially flat surface, adapted to serve as a spring seat, and having a flange at one end abutting and secured to said flange on the housing for transmitting torque thereto, and a saddle arranged on the opposite side of said tubular end portion from said member and provided with seats for spring bolts.

7. In axle construction, the combination of a pressed metal housing having a tubular end portion and an integral flange at the end thereof, a pressed metal saddle having a rectangular intermediate portion and conforming at one end to the exterior of said tubular end portion of the housing, the other end having a flange abutting said flange on the housing, and the ends of said saddle being rigidly secured to said housing for the purpose of transmitting torque.

8. In axle construction, the combination of an axle housing having a tubular end portion, a saddle member seated upon said end portion with its ends conforming to the exterior of the housing, said saddle member having an intermediate portion of polygonal cross-section, and the ends of said saddle member being secured to said housing.

9. In axle construction, the combination of an axle housing having an integral radial flange at the end thereof, a tubular extension for said housing having a radial flange, and a saddle arranged on said housing and having a radial flange, all of said flanges being secured together.

10. In axle construction, the combination of an axle housing having an integral radial flange at the end thereof, a tubular extension for said housing having a radial flange, and an axially extending flange on the periphery of said radial flange surrounding said housing flange, a saddle arranged on said housing and having a radial flange, and all of said radial flanges being secured together.

11. In axle construction, the combination of an axle housing having an integral radial flange at the end thereof, a tubular extension for said housing having a radial flange, and an axially extending flange on the periphery of said radial flange surrounding said housing flange, a saddle arranged on said housing and having a radial flange, a brake anchor member on said extension and said member and all of said radial flanges being secured together.

12. In axle construction, the combination of an axle housing having an integral radial flange at the end thereof, a tubular extension for said housing having a radial flange, a disk arranged between said flanges, a brake anchor member on said extension, a saddle arranged on said housing and having a radial flange, said disk, said member and said flanges being all secured together.

13. In axle construction, the combination of an axle housing having an integral flange at the end thereof, a tubular extension for said housing having a radial flange, and an axially extending flange on the periphery of said radial flange surrounding said housing flange, a disk arranged between said radial flanges, and a saddle arranged on said housing and having a radial flange, said disk and all of said radial flanges being secured together.

In testimony whereof I affix my signature.

WALTER C. KEYS.